United States Patent Office 3,830,861
Patented Aug. 20, 1974

3,830,861
MANUFACTURE OF DIALKYNYL ARYL COMPOUNDS
James M. Watson, Big Spring, Tex., assignor to Cosden Oil & Chemical Company, Big Spring, Tex.
No Drawing. Filed Feb. 19, 1971, Ser No. 117,069
Int. Cl. C07c 15/04
U.S. Cl. 260—668 R                    17 Claims

ABSTRACT OF THE DISCLOSURE

A process for the preparation of dialkynyl aryl compounds which comprises the steps of (1) intimately mixing at a temperature of 0 to 150° C. an aromatic diketone of the formula

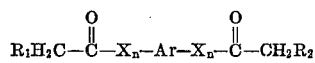

wherein $R_1$ and $R_2$ are radicals which may be the same or different and which are selected from the group consisting of hydrogen and hydrocarbonyl radicals of 1 to 10 carbon atoms, X is an alkylene radical and $n$ is 0 or an integer of 1 to 6, Ar is a radical selected from the group consisting of mononuclear and polynuclear carbocyclic and heterocyclic aryl radicals, and wherein the two ketonic radicals are attached to Ar, with the reaction product of an acid halide containing an element selected from the group consisting of phosphorus, sulfur and carbon and an N,N-dihydrocarbonyl substituted amide to thereby produce a bis(beta-halo-alpha, beta-unsaturated carbonyl) substituted aryl compound, and (2) treating said resulting substituted aryl compound with a base selected from the group consisting of the hydroxides of the alkali and alkaline earth metals and the alkoxides of the alkali metals, and (3) recovering dialkynyl aryl compounds of the formula

wherein $R_1$, $R_2$, Ar, X and $n$ all correspond to those in the aromatic diketone introduced into step (1) above.

BACKGROUND OF THE INVENTION

The present invention relates to a procedure for the preparation of diacetylenically substituted aryl compounds. More particularly, the present invention relates to a process for the preparation of dialkynyl aryl compounds from aromatic diketones.

The dialkynyl aryl compounds have been found to be very useful in the preparation of particularly useful polymer compositions some of which are very resistant to high temperatures. In the past, the preparation of the dialkynyl aryl compounds primarily has been by halogenation of dialkenyl aryl compounds followed by dehydrohalogenation of the resulting halogenated dialkenyl aryl compounds. While this method is satisfactory in many respects, there are certain disadvantages involved in its practice which make desirable the finding of new and improved methods and routes for the commercial production of dialkynyl aryl compounds.

Exemplary of the disadvantages found in the above described known method for preparing dialkynyl aryl compounds are those found in the preparation of diethynylbenzenes from divinylbenzenes via the bromination and subsequent dehydrobromination of the divinylbenzenes. In employing this method of preparation, it is quite difficult to obtain the divinylbenzenes in the relatively pure form desired due to the difficulty of preventing polymer formation during distillation of divinylbenzene fractions to effect purification thereof. Additionally, without very careful control of the halogenation and dehalogenation steps of the process, the resulting diethynylbenzene product is contaminated with significant quantities of difficultly separable by-product impurities such as ethynylvinylbenzenes. Also, a significant disadvantage is found in the handling of the bromine required, bromine and many of its by-products produced in this process being relatively dangerous to handle and highly corrosive to the equipment involved as well as, in some instances, difficult to remove. Further, bromine and certain of the resulting products formed in the process tend to catalyze polymerization of the unsaturated reactants and products during the course of the process. Still further, in this prior art process, the yield of the desired diethynylbenzene is not as good as is desired.

It is now an object of the present invention to provide a new and improved process for the preparation of dialkynyl aryl compounds.

Another object of the present invention is to provide a new process for producing dialkynyl aryl hydrocarbons which process results in improved yields of the desired dialkynyl aryl product.

An additional object of the present invention is to provide a new and improved process for the production of dialkynyl aryl hydrocarbons wherein fewer undesirable by-products are produced.

Still another object of the present invention is to provide a new and improved process for the production of dialkynyl aryl hydrocarbons in which bromine is not employed.

A particular object of the present invention is to provide a new and improved process for the production of diethynylbenzene in better yields and with fewer undesirable by-products, employing feed materials other than divinylbenzene and wherein bromine is not employed in such process.

Additional objects will become apparent from the following description of the invention herein disclosed.

SUMMARY OF THE INVENTION

The present invention, which fulfills the above and other objects, is a process for the preparation of dialkynyl aryl compounds which comprises the steps of (1) intimately mixing at a temperature of 0 to 150° C. an aromatic diketone of the formula

wherein $R_1$ and $R_2$ are radicals which may be the same or different and which are selected from the group consisting of hydrogen and hydrocarbonyl radicals of 1 to 10 carbon atoms, X is an alkylene radical and $n$ is 0 or an integer of 1 to 6, Ar is a radical selected from the group consisting of mononuclear and polynuclear carbocyclic and heterocyclic aryl radicals, and wherein the two ketonic radicals are attached to Ar, with the reaction product of an acid halide containing an element selected from the group consisting of phosphorus, sulfur and carbon and an N,N-dihydrocarbonyl substituted amide to thereby produce a bis(beta-halo-alpha, beta-unsaturated carbonyl) substituted aryl compound, and (2) treating said resulting bis-(beta-halo-alpha,beta-unsaturated carbonyl) substituted aryl compound with a base selected from the group consisting of the hydroxides of the alkali and alkaline earth metals and the alkoxides of the alkali metals, and (3) recovering dialkynyl aryl compounds of the formula

wherein $R_1$, $R_2$, Ar, X and $n$ all correspond to those in the aromatic diketone introduced into step (1) above.

By the process of the present invention, improved yields of the desired dialkynyl aryl compounds are obtained and fewer difficultly separable undesirable by-products are formed. Also, the process of the present invention does not require the handling and use of bromine or other halogen as such, and does not require the use of a readily polymerizable feed material which itself is relatively difficult and expensive to obtain in required purity.

DESCRIPTION OF THE PREFERRED EMBODIMENTS OF THE PRESENT INVENTION

The process of the present invention has as a first step conversion of an aromatic diketone to an aromatic bis-(beta-halo-alpha,beta-unsaturated carbonyl) compound. The aromatic diketone is one having the formula

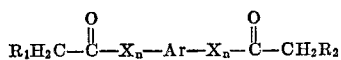

wherein $R_1$ and $R_2$ are radicals which may be the same or different and which are selected from the group consisting of hydrogen and hydrocarbonyl radicals of 1 to 10 carbon atoms, X is an alkylene radical and $n$ is 0 or an integer of 1 to 6, Ar is a radical selected from the group consisting of mononuclear and polynuclear carbocyclic and heterocyclic aryl radicals. Preferably the two ketonic radicals are attached to Ar at non-adjacent carbon atoms. In general, $R_1$ and $R_2$ if a hydrocarbonyl radical may be an aryl, acyclic or alicyclic hydrocarbon radical. If aryl, the radical may be a phenyl, naphthyl, or a condensed ring or partially condensed ring aromatic radical. If acyclic, R may be straight or branched chain, and if alicyclic may be mono or dicyclic and may be substituted or unsubstituted. If $n$ is an integer, the alkylene radical X may be straight chain or may have alkyl or other substituents thereto. Ar may be a phenylene, naphthylene, or other divalent carbocyclic aryl radical or a heterocyclic ring such as pyridine, quinoline, pyran, thiopyran or the like. Within the group of diketones useful in the practice of the present invention are the following nonlimiting examples; meta and para-diacetyl benzene, 1,3-bis(propane-1-one) benzene, 1,4-bis(propane-1-one) benzene, 1,3-bis(butane-1-one) benzene, 1,4-bis(butane-1-one)benzene, 1,3-bis-(propane-2-one) benzene, 1,4-bis(butane-2-one)benzene, 1-(propane-1-one)-3-(butane-1-one)benzene and the like. The most useful diketones for the practice of the present invention are those of the above formula wherein $n$ is 0, 1 or 2, preferably 0, and wherein $R_1$ and $R_2$ are hydrogen or alkyl radicals of 1 to 4 carbon atoms, preferably hydrogen or alkyl radicals of 1 to 2 carbon atoms. Also, these most useful diketones are those in which Ar is a phenylene radical. In a particularly useful application of the process of the present invention, the aromatic diketone is one selected from the group consisting of meta and para-diacetylbenzene. The most preferred application of the process of the present invention is in the conversion of the meta- and para-diacetylbenzenes to meta- and para-diethynylbenzenes, respectively.

The aromatic diketones employed as starting materials for producing the dialkynyl aryl compounds in accordance with the process of the present invention may be obtained by conventional and known oxidation processes whereby dialkyl aromatics are oxidized. In many instances, such diketones are available in substantial quantities as under-oxidized by-products of oxidization processes designed primarily for the production of diacids from dialkyl aromatics. However, since numerous sources and methods for obtaining the aromatic diketone feeds of the present process, either as a principal or by product, are known to the art, the source of the aromatic diketone is not a part of the present invention.

In carrying out the process of the present invention, the above defined aromatic diketone is intimately mixed with the reaction product of an acid halide and an N,N-dihydrocarbonyl substituted amide. The acid halide usually is one containing at least one of the elements phosphorus, sulfur or carbon. Among the acid halides useful are the following nonlimiting examples: $POCl_3$, $COCl_2$, $SOCl_2$, $PCl_3$, $SO_2Cl_2$, mixtures of these and the like. In the preferred practice of the present invention, the acid halide employed is most often $POCl_3$ and $COCl_2$ with $COCl_2$ being the more preferred.

The N,N-dihydrocarbonyl substituted amide employed as a reactant in the process of the present invention usually is one containing not more than a total of 12 carbon atoms in all of the three substituents to the N radical. Usually, these three substituents will have no more than four carbon atoms each, preferably 1 to 2 carbon atoms each. Such N,N-substituted amides as those in which the N,N-substituents represent an N containing heterocyclic ring are also included within the scope of the amides useful in the practice of the process of the present invention. Among the particular compounds which may be employed in the practice of the present invention are the following nonlimiting examples: dimethylformamide, dimethylacetamide, dimethylpropionamide, diethylformamide, diethylpropionamide, dipropylformamide, dipropylacetamide, methylethylformamide, dibutylacetamide, N - formylmorpholine, N-formylpyridine, N-acetylmorpholine, N-acetylpyridine, N - formyl - N - methylaniline, N-ethyl acetanalide, N,N-diphenylformamide, and the like. In the preferred practice of the process of the present invention, the amide used most often is dimethylformamide, dimethylacetamide, diethylformamide, diethylacetamide, methylethylformamide, methylethylacetamide, or a mixture of any of these. Preferably, however, the amide employed is dimethylformamide or dimethylacetamide with the dimethylformamide being the more preferred of the two.

In reacting the acid halide with the N,N-dihydrocarbonyl substituted amide in accordance with the present invention, the two are brought together under conditions whereby good contact of the reactants is obtained. This reaction usually is carried out at a temperature within the range of —25 to 150° C. with agitation. Preferably, the reaction temperature is maintained within the range of 0 to 50° C. Pressures may range from sub-atmospheric to 300 p.s.i.g. and higher in this reaction. In general, however, autogenous pressures are employed and seldom will 80 p.s.i.g. be exceeded. The reaction time will vary depending upon efficiency of contact of reactants, temperature, etc. However, it should be complete within four hours and more often, in less than one hour.

The amount of acid halide and N,N-dihydrocarbonyl substituted amide employed usually will be within the range of 1 to 50 moles amide and higher per mole of acid halide, preferably within the range of 2 to 20 moles amide per mole of acid halide to thereby provide a relatively large excess of the amide. With the preferred $COCl_2$, higher ratios of amide to acid within the above ranges are usually employed. As will be further mentioned below, the reaction of the acid halide-amide reaction product with the aromatic diketone is carried out in the presence of a solvent. For practical reasons, it is preferred in most instances to employ as such solvent the same amide as is used for reaction with the acid halide thereby accounting for the above mentioned preferred excess of such amide.

Reaction of the aromatic diketone with the reaction product of the acid halide and the N,N-dihydrocarbonyl substituted amide most often is carried out at a temperature within the range of 0 to 150° C. As a result of the exothermic nature of this reaction, it is sometimes desirable to provide for heat exchange means or cooling to remove the heat of reaction. Preferably, the temperature of the reaction is maintained within the range of 20 to 60° C. Pressures during this reaction generally are autogenous but may range from subatmospheric to superatmospheric pressures of 100 to 200 p.s.i.g. and higher. This reaction between the aromatic diketone and the reaction product of the halide and the amide is generally complete in less than five hours if carried out under the above conditions. Preferred reaction times usually are less than three hours.

Upon substantial completion of the reaction between the aromatic diketone and the reaction product of the acid halide and the above defined amide, the desired aromatic bis(beta-halo-alpha,beta-unsaturated carbonyl) product is obtained by subjecting the reaction mixture to hydrolysis. The hydrolysis generally is effected by treating the reaction mixture with water under temperature conditions of 0 to 50° C. In most instances, hydrolysis is complete under such conditions within less than five hours. In some instances, particularly when using acid halides other than $COCl_2$, neutralization may be desirable along with hydrolysis. In such event, neutralization is carried out by adding a basic material which generally results in precipitation of the desired product. The basic material may be any of the common bases such as the alkali metal and alkaline earth metal hydroxides, carbonates, bicarbonates and the like.

The bis(beta-halo-alpha,beta-unsaturated carbonyl) product of the first step of the process of the present invention is subjected to dehalocarbonylation by treatment with a suitable base in the presence of a solvent. While many basic materials are useful as a base, most often the base employed in an alkali or alkaline earth metal hydroxide such as sodium hydroxide, potassium hydroxide, lithium hydroxide, calcium hydroxide, and the like. Also, the alkoxide bases may be employed, i.e., sodium methoxide, sodium ethoxide, potassium tertiary butoxide, and the like can be used. In the preferred practice of the present invention, such basic materials as sodium and potassium hydroxide and calcium hydroxide are most often employed.

In using the above basic compounds for dehalocarbonylation, the amount employed usually is such as to provide a 2 to 20 molar ratio of basic compound to the aromatic bis(beta-halo-alpha,beta-unsaturated carbonyl). Preferably, however, the amount of base employed is such to provide such molar ratio within the range of 2 to 5.

Among the solvents used for carrying out the dehalocarbonylation step are water, ethers, halogenated hydrocarbons, and hydrocarbons. Nonlimiting examples of suitable ethers are such compounds as ethyl n-butyl ether, dibutyl ether, diallyl ether, diamyl ether, ethyl n-propyl ether, ethyl isopropyl ether, 1,3 and 1,4-dioxane, tetrahydrofuran and the like. Among the halogenated hydrocarbons suitable as solvents are such compounds as dichloromethane, trichloroethane, chloroform, carbon tetrachloride, dichloroethane, and the like. Such hydrocarbons as benzene, toluene, cyclohexane, hexane, heptane, octane, xylenes, and the like may be employed as the solvent. Preferably the solvent will be one having a boiling point within the range of 50 to 125° C. Within such solvents, the most useful are 1,3 and 1,4-dioxane, tetrahydrofuran, heptane, toluene, benzene, cyclohexane, carbon tetrachloride, chloroform, and dichloroethane. The most useful of the solvents for carrying out the dehalocarbonylation step are those selected from the group consisting of 1,4-dioxane, tetrahydrofuran and benzene with 1,4-dioxane and tetrahydrofuran being the preferred solvents.

The amount of solvent employed for dehalocarbonylation is that adequate for complete dissolution of the aromatic bis(beta-halo-alpha,beta-unsaturated carbonyl). Of course, this amount will vary depending upon the solvent and its determination is well within the ability of those skilled in the art.

The conditions under which the dehalocarbonylation step is carried out includes temperatures of no lower than 25° C. and generally, no higher than 150° C. Within this range, it is found preferable to carry out the dehalocarbonylation at a temperature of from about 50° C. to about 100° C. Usually, the reaction is complete within three to four hours, the optimum reaction time being to a large extent dependent upon temperature of reaction and the efficiency of mixing of the base compound with the aromatic bis(beta-halo-alpha,beta-unsaturated carbonyl). Utilizing the preferred temperature range and with relatively efficient mixing of reactants, reaction time generally will be within the range of 15 to 45 minutes. The pressure at which the dehalocarbonylation reaction is carried out usually is the autogenous pressure. However, pressures ranging from subatmospheric to superatmospheric may be employed. As a practical matter, pressures at or slightly above atmospheric are preferably used.

Upon completion of the dehalocarbonylation reaction, it may be desirable to neutralize the reaction mass though it is not necessary. In such instance, neutralization generally requires the addition of an acid material such as a mineral or organic acid.

After dehalocarbonylation and neutralization of the reaction mass, if employed, the organic and aqueous phases are separated. The organic phase is then subjected to distillation or sublimation, in the case of certain solid products, to recover the dialkynyl aryl compound. Since the dialkynyl aryl compounds readily polymerize, this distillation generally is carried out under vacuum, preferably at a vacuum sufficiently low that the dialkynyl aryl compound will boil overhead at a temperature below 125° C., preferably below 80° C. Sublimation also is carried out at temperatures below 125° C., preferably below 80° C. To further aid in distilling the dialkynyl aryl compounds without polymerization, it is frequently desirable to add an inert diluent to the feed material to the distillation. The addition of such as inert diluent is the subject matter of co-pending application Ser. No. 105,726 filed Jan. 11, 1971.

In order to further describe and to specifically illustrate the present invention, the following examples are presented. It is to be understood, of course, that these examples are presented by way of illustration and not of limitation.

EXAMPLE I

Dimethylformamide (150 ml.) was placed in one liter stirred reactor which was cooled in an ice water bath and phosphoryl chloride (115 g., 0.75 mole) was added thereto; the resulting deep red reaction mass was stirred with continued cooling until the temperature had dropped to 15–20° C. A solution of m-diacetylbenzene (50 g., 0.31 mole) in dimethylformamide (75 ml.) was added and the temperature of the resulting reaction mixture was maintaned at 40° with intermittent cooling until the spontaneous reaction subsided (approximately 1 hour). Stirring at ambient temperature (70–75° F.) was continued for 17–18 hours; the reaction mixture was again cooled in an ice water bath and hydrolyzed with ice water (500 ml.). The resulting hydrolysate was stirred for one-half hour and was then neutralized with sodium acetate (296 g.), whereupon the product precipitated as a yellow solid. The crude product was isolated by vacuum filtration, thoroughly washed with water (100 ml.), refiltered, and dried. The yield was 52.5 g. (66.3%). m.p. 114–118° C. (two recrystallizations from isopropanol/p-dioxane gave 1,3-bis (1-chloropropen-3-al)benzene, m.p. 123.5–127° C.).

To a solution of aqueous (250 ml.) sodium hydroxide (20.0 g., 0.5 mole) at 75° C. was added the 1,3-bis(1-chloropropen-3-al)benzene (m.p.=114–118° C., 30 g., 0.11 mole) prepared as above described, in 1,4-dioxane (400 ml.). The resulting reaction mixture was stirred at 75° C. for forty-five minutes, cooled to room temperature, neutralized with 10% HCl (125 ml.), and saturated with NaCl. The phases were separated and the aqueous phase was extracted with ether. The resulting organic phases were combined, diluted by the addition of tetraethylbenzene, and subjected to vacuum distillation to obtain m-diethylnylbenzene, m.p. 46–480 C. at 1 mm. Hg. The yield was 9.4 g. (63.5%).

EXAMPLE II

Example I was substantially repeated with a yield of 69.5% m-diethynylbenzene being obtained.

EXAMPLE III

Example I was substanially repeated with the exception that para-diacetylbenzene is substituted for the meta-diacetylbenzene and the amount of ice water employed in the hydrolysis of the first step reaction product was approximately 800 ml. In this example, a good yield of para-diethynylbenzene was obtained.

EXAMPLE IV

Dimethylformamide (100 ml.) was added to a 250 ml. round bottom flask fitted with a gas dispersion tube and Dry Ice condenser. Phosgene ($COCl_2$) gas was introduced into the dimethylformamide through the dispersion tube with stirring until a weight increase of 17.3 grams, indicating an uptake 0.175 mole phosgene, was obtained. A solid complex was formed in this manner. To this reaction mass was added 13.8 grams (0.085 mole) m-diacetylbenzene. The reaction mass was continuously stirred. Intermittent cooling was employed to keep the reaction temperature just below 60° C. After reaction was essentially complete, the resulting reaction mass was hydrolyzed with 750 ml. of water to obtain, upon filtration, 18.7 grams of solids. These solids were washed with additional water and dried under vacuum. The yield of the crude product having a melting point of 92–103° C. obtained was 17.5 grams (78.5%).

The crude product (150 grams) prepared as described in the previous paragraph was added to a solution of aqueous sodium hydroxide (1250 ml. $H_2O$, 100 gr. NaOH) at 75° in 1,4-dioxane (1500 ml.). The resulting reaction mixture was stirred at 75° C. for three-quarters of an hour, cooled to room temperature, neutralized with 10% HCl (600 ml.), and saturated with NaCl. The resulting phases were separated and the aqueous phase extracted with ether to obtain all organics therefrom. The resulting organic phases were combined, diluted by the addition of tetraethylbenzene, and subjected to vacuum distillation to obtain m-diethynylbenzene in very good yield (69.5%).

EXAMPLE V

Example IV was substantially repeated with the exception that 7.3 grams (0.045 mole) para-diacetylbenzene was substituted for the meta-diacetylbenzene as the reactant. Also, the amount of dimethylformamide used was 100 ml. and the amount of $COCl_2$ was 9.1 grams (0.092 mole). In this example, a yield of 75.5%, 1,4-bis(1-chloropropen-3-al)benzene was obtained.

Dehalocarbonylation of 1,4 - bis(1-chloropropen-3-al) benzene prepared in such manner is carried out as described in Example IV above. A good yield of para-diethynylbenzene is obtained.

What is claimed is:

1. A process for the preparation of dialkynyl aryl compounds which comprises the steps of (1) intimately mixing at a temperature of 0 to 150° C. and in the presence of a solvent consisting essentially of N,N-dialkyl substituted amide, an aromatic diketone of the formula

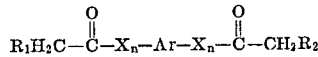

wherein $R_1$ and $R_2$ are radicals which may be the same or different and which are selected from the group consisting of hydrogen and hydrocarbonyl radicals of 1 to 10 carbon atoms, X is an alkylene radical and $n$ is 0 or an integer of 1 to 6, Ar is a radical selected from the group consisting of mononuclear and polynuclear carbocyclic and heterocyclic aryl radicals, and wherein the two ketone radicals are attached to Ar at non-adjacent carbon atoms, with the reaction product of phosgene and an N,N-dialkyl substituted amide, (2) subjecting the resulting reaction mixture to hydrolysis by the step consisting essentially of contacting such reaction mixture with water to thereby produce a bis(beta-halo-alpha,beta-unsaturated carbonyl) substituted aryl compound, and (3) treating said resulting substituted aryl compound at a temperature within the range of 25 to 100° C. with a base selected from the group consisting of the hydroxides of the alkali and alkaline earth metals and the alkoxides of the alkali metals, the amount of said base being sufficient to provide a molar ratio of base to bis(beta-halo-alpha,beta-unsaturated carbonyl) substituted aryl compound within the range of 2 to 20, said treating being carried out in the presence of a solvent selected from the group consisting of water, ethers, halogenated hydrocarbons and hydrocarbons, and (4) recovering dialkynyl aryl compounds of the formula

wherein $R_1$, $R_2$, Ar, X and $n$ all correspond to those in the aromatic diketone introduced into step (1) above.

2. The process of Claim 1 wherein at least one of $R_1$ and $R_2$ is hydrogen.

3. The process of Claim 1 wherein at least one of $R_1$ and $R_2$ is a hydrocarbonyl radical of 1 to 10 carbon atoms.

4. The process of Claim 1 wherein $n$ is 0.

5. The process of Claim 1 wherein Ar is a phenyl radical.

6. The process of Claim 1 wherein said aromatic diketone is one selected from the group consisting of meta- and para-diacetylbenzene, 1,3-bis(propane - 1 - one)benzene, 1,4-bis(propane - 1 - one)benzene, 1,3-bis(butane-1-one)benzene, 1,4-bis(butane - 2 - one)benzene, and 1-(propane-1-one)-3-(butane-1-one)benzene.

7. The process of Claim 6 wherein said aromatic diketone is meta-diacetyl benzene.

8. The process of Claim 6 wherein said aromatic diketone is para-diacetyl benzene.

9. The process of Claim 1 wherein said N,N-dialkyl substituted amide is dimethylformamide.

10. The process of Claim 1 wherein said N,N-dialkyl substituted amide is dimethylacetamide.

11. The process of Claim 1 wherein Step (1) is carried out at a temperature within the range of from 0 to 150° C.

12. The process of Claim 1 wherein said base employed in Step (2) is an alkali metal hydroxide.

13. The process of Claim 12 wherein said base is sodium hydroxide.

14. The process of Claim 12 wherein said base is potassium hydroxide.

15. The process of Claim 1 wherein said base employed in Step (2) is an alkaline earth metal hydroxide.

16. The process of Claim 1 wherein said base employed in Step (2) is an alkoxide of an alkali metal.

17. The process of Claim 1 wherein Steps (1) and (2) are carried out simultaneously within a single reaction.

References Cited

UNITED STATES PATENTS 3,696,158  10/1972  Relles _____ 260—668 R
3,700,743  10/1972  Relles _____ 260—668 R

OTHER REFERENCES

Bodendorf et al.: Angew. Chem. (Internet. Edit.), vol. 2 (1963), No. 2, pp. 98 and 99.

Arnold et al.: Collection of Czech. Chem. Comm., vol. 24, pp. 2385–2392 (1959).

Zemlicka et al.: Collection of Czech. Chem. Comm., vol. 26, pp. 2852–6 (1961).

Arnold et al.: Proc. Chem. Soc., vol. 7 (1963), p. 227.

CURTIS R. DAVIS, Primary Examiner

U.S. Cl. X.R.

260—599